United States Patent [19]

Kespohl

[11] Patent Number: 5,767,686

[45] Date of Patent: Jun. 16, 1998

[54] DEVICE FOR CONTACTLESS DETECTION OF THE POSITION OF A MOVING WEB

[75] Inventor: Peter Kespohl, Kelkheim, Germany

[73] Assignee: Fife Corporation, Germany

[21] Appl. No.: 622,488

[22] Filed: Mar. 26, 1996

[30] Foreign Application Priority Data

Mar. 30, 1995 [DE] Germany .................. 195 11 646.1

[51] Int. Cl.⁶ .......................... G01N 27/22; G01R 27/26
[52] U.S. Cl. .................. 324/662; 324/661; 324/681; 324/687; 324/688
[58] Field of Search ....................... 324/660, 661, 324/662, 663, 671, 674, 681, 686, 687, 688, 690

[56] References Cited

U.S. PATENT DOCUMENTS

| | | | |
|---|---|---|---|
| 3,312,892 | 4/1967 | Parnes | 324/660 |
| 3,323,699 | 6/1967 | Bricker, Jr. | 226/15 |
| 3,341,774 | 9/1967 | Dyben | 324/663 |
| 3,812,424 | 5/1974 | Abbe | 324/688 |
| 4,322,678 | 3/1982 | Capots et al. | 324/663 |
| 4,719,409 | 1/1988 | Dorman | 324/681 |
| 4,837,500 | 6/1989 | Abbringh | 324/660 |
| 4,893,071 | 1/1990 | Miller | 324/660 |
| 4,922,181 | 5/1990 | Pullan | 324/664 |
| 5,134,379 | 7/1992 | Maher et al. | 324/663 |
| 5,309,110 | 5/1994 | O'Niel et al. | 324/674 |
| 5,394,095 | 2/1995 | Kespohl | 324/674 |

*Primary Examiner*—Maura K. Regan
*Assistant Examiner*—Glenn W. Brown
*Attorney, Agent, or Firm*—Dunlap & Codding, P.C.

[57] ABSTRACT

The present invention relates to a device for the contactless detection of the position of a moving webs. The web has on one side of the web a detector electrode covering its entire width and on the other side in the area of the web edges transmission electrodes fed by an oscillator in phase opposition, so that the capacitive couplings between the transmission electrodes and the detector electrode respond in opposing fashion to deviations of the web from the central position. The signal received by the detector electrode is processed by a current to voltage converter with a very small input impedance so that the potential of the detector electrode remains at zero, and virtually no capacitive displacement currents flow to a screening electrode In this way, the sensitivity of the measurement array is independent of the web width.

26 Claims, 2 Drawing Sheets

DEVICE FOR CONTACTLESS DETECTION OF THE POSITION OF A MOVING WEB

BACKGROUND OF THE INVENTION

1. Field of the Invention

The present invention relates to a device for the contactless detection of a moving web, and more particularly, but not by way of limitation, to a device for the contactless detection of a moving web wherein the device has a detector electrode disposed adjacent one side of the web and wherein the detector electrode and the web are maintained at substantially the same voltage potential such that the interference capacitance between the web and the detector electrode is substantially eliminated.

2. Description of Related Art

The present invention concerns a device for the contactless detection of the position of a moving web consisting of conductive material and connected to zero or ground potential, with a width detector electrode on one side of the web, arranged parallel to the web and overlapping the area of the web edges, and a pair of edge electrodes arranged on the other side of the web in the area of its edges opposite the width detector electrode, whereby one of the two electrode arrays forms a transmission electrode array connected to an oscillator and the other a detector electrode array capacitively coupled to the transmission electrode array in such a way that two coupling paths are formed in the area of the two edges of the web and a lateral displacement of the web acts on the two couplings in opposing ways, and whereby an evaluation circuit is connected to the detector electrode array to obtain a position deviation signal to control the web movement. Such a device is known from Patent No. DE-PS 40 09 697.

In this known device, the first element in the evaluation circuit for obtaining the position deviation signal is a voltage measurement array with a certain, relatively high-ohmage input resistance, at which the capacitive transfer currents cause a voltage drop, which is amplified by an input amplifier and if necessary led to a demodulator for further processing.

To screen out external interference with the detector electrodes, these are provided with screening electrodes, whose potential has to match the potential of the detector electrode(s). Therefore, this known device for detecting the position of a moving web is largely immune to external interference, and is more sensitive to changes of web position than the devices described in DE-OS 27 44 785.

However, the devices described above also have the drawback that the sensitivity to changes in the position of the web depends on the width of the web. For certain applications, this makes the measuring device unusable, because with such a device it is impossible to set the control apparatus without knowing the width of the web.

The dependence of measuring sensitivity on the width of the web is due to the capacitive load on the detector electrode(s) by the web itself. This arises because of the interference capacitance(s) formed by the detector electrode(s) and the web, which varies according to the width of the web. In a design where the width measuring electrode is the detector electrode, this interference makes itself felt where, with the web in a non-central position, an A.C. voltage potential other than zero occurs at the electrode. This A.C. voltage at the detector electrode is loaded with the interference capacitance between the web and the detector electrode, forming a parasitic shunt to the measuring resistor. The capacitive displacement current flowing across this capacitance reduces the voltage at the detector electrode, because a capacitive voltage divider is formed between the transmission electrodes, the detector electrode and the web. The larger the interference capacitance between the detector electrode and the web, the smaller the voltage at the detector electrode.

This state of affairs means that the known capacitive web centre sensor is less sensitive with webs of larger width than the webs of small width. In other words, a lateral displacement of a narrow web produces a larger voltage change at the detector electrode than the same lateral displacement with wider webs.

In terms of the web position control system, this effect means that the control system responds more slowly and sluggishly with wide webs than is the case with narrow webs. These same adverse consequences can be observed when the web approaches the detector electrode. This too leads to an increase in interference capacitance and thus to a voltage reduction at the detector electrode and to a reduction in the sensitivity of the sensor.

The aim of the invention is to improve the device for detecting the position of a moving web of the aforementioned type in such a way that, while retaining the compact design, the insensitivity to external interference and the good sensitivity to changes in web position, there is no change in sensitivity as a function of web width.

Based on the aforementioned design of a device for detecting the position of a moving web, the invention resolves this problem by virtue of the fact that the evaluation circuit forces the potential of the detector electrodes) to remain at zero. This can be achieved in particular by ensuring that the input impedance of the evaluation circuit is very small. The currents discharged via the evaluation circuit then serve to provide the measuring signal. Where a non-linear system is used, the input impedance of the evaluation circuit must be very small, at least for the given signal profile.

If zero potential always occurs at the detector electrode, even when the web is not running centrally through the position detection device, the interference capacitance between the web and the detector electrode has no effect on the potential at the detector electrode, because the web and the detector electrode have the same potential. Therefore, no capacitive displacement current flows between the web and the detector electrode, achieving a situation whereby the width of the web does not interfere with the sensitivity of the web centre sensor.

This also means that the sensor is not sensitive to any approach of the web towards the detector electrode or to any twisting of the web out of the horizontal position.

Advantageous refinements of the invention are described in the subclaims.

The invention is further explained below, based on a description of examples of the design.

BRIEF DESCRIPTION OF THE DRAWINGS

FIG. 3 is a diagrammatic, partial cross-sectional, schematic view of the sensor device of FIG. 1 having an

DETAILED DESCRIPTION

In the illustrations, the arrangement of the electrodes relative to a moving web or grounded strip of conductive material 2 is shown in schematic cross-section, i.e. the web 2 moves into or out of the plane of projection, and is surrounded at a certain distance by the different electrodes.

Figure 1:
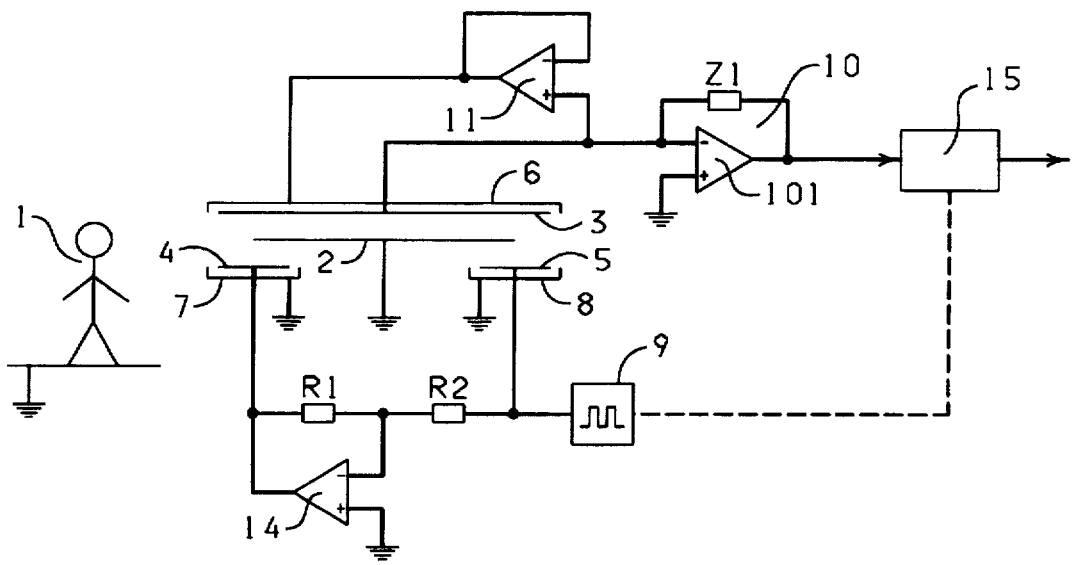
FIG. 1 is a diagrammatic, partial cross-sectional, schematic view of a sensor device constructed in accordance with the present invention.

Observing the first illustration in FIG. 1, transmission electrodes 4 and 5 are arranged below the web 2 in the area of its edges, and are screened by screening electrodes 7 and 8 which are associated with the electrodes 4 and 5 substantially as shown in FIG. 1. The transmission electrodes 4 and 5 have portions extending beyond the respective edges of the web 2. An oscillator 9 sends a signal to transmission electrode 5 directly, and to transmission electrode 4 via an inverting amplifier 14. The inverting amplifier 14 is an operational amplifier which, in conjunction with resistors R1, R2, causes a 180° phase shift in the signal.

Above the web 2, extending across its entire width and having portions extending beyond the adjacent edge areas, is a detector electrode 3, to which an evaluation circuit means, such as a current-to-voltage converter 10, is connected. The current-to-voltage converter 10 comprises an operational amplifier 101 and an impedance Z1 which feeds back the output of the operational amplifier 10 to the inverting input. The output of the current-tovoltage converter 10 is sent to a demodulator 15.

The area of the detector electrode 3 which is turned away from the web 2 is surrounded by a screening electrode 6, which is connected to the output of an isolation amplifier 11, whose input is connected to the detector electrode 3.

In operation, the oscillator 9 feeds the transmission electrode 5 and the inverting amplifier 14. The inverting amplifier 14 ensures that the same signal amplitude is present at the transmission electrode 4 as to transmission electrode 5, except that the phase angle of the signal at transmission electrode 4 is shifted through 180° relative to the signal at transmission electrode 5. Under these conditions, no signal will be present at the detector electrode 3 if the web 2 is running centrally through the device, because a capacitive displacement current flows from each of the two transmission electrodes 4 and 5 to the detector electrode 3, and the effects of the two currents are cancelled out at the detector electrode 3.

If the web 2 now moves out of its central position, the capacitive coupling will become stronger on one edge and weaker on the other. The capacitive displacement current from one transmission electrode will prevail over the other transmission electrode, producing a differential current in the detector electrode 3. This differential current reaches the negative input of the operational amplifier 101, which is negatively fed back via Z1. The non-inverting input of the operational amplifier 101 is connected to ground potential. The operational amplifier 101 is designed in such a way that it has a very high input impedance. Under these conditions the differential current of the web centre sensor must for the most part flow through the negative feedback resistor Z1, and the voltage drop at Z1 determines the output voltage U. of the operational amplifier 101.

The phase angle of the output voltage U. indicates which coupling has become stronger and which weaker, and thus the direction of displacement of the web 2. A dashed line shows a signal path for the phase angle from the oscillator 9 to the demodulator 15.

the input voltage U of the operational amplifier 101 is given by $$U = -U_i/V/$$

where $U_i$ is the voltage at the input, U. is the voltage at the output and V. is the open-loop voltage gain of the operational amplifier 101. If the operational amplifier 101 is designed in such a way that V. is very large, then the voltage at the input of the operational amplifier 101 and thus also at the detector electrode 3 will be very small, and the current-to-voltage converter 10 will generally exhibit a very low input impedance such that the current-to-voltage converter 10 maintains the detector electrode 3 at substantially the same voltage potential as the web 2 so that the voltage potential on the detector electrode 3 follows the voltage potential on the web 2 whereby interference capacitance between the web 2 and the detector electrode 3 is substantially eliminated. The voltage U. occurring at the output of the currentto-voltage converter 10 arises in this circuit because of the voltage drop generated by the differential current at Z1 and is proportional to the differential current and the feedback impedance Z1. The A.C. output voltage of the current-to-voltage converter 10 is thus a measure of the position of the web 2 in the device. It can either be used directly or converted by a demodulator 15 into a proportional D.C. voltage.

The screening electrode 6 serves to prevent interference from the environment, which may be caused by people 1 standing nearby or by asymmetrically arranged, conductive machine parts, and also by interference fields of other devices of the overall installation (welding machines, electrostatic oilers, thyristor-controlled motors etc.). Simple earthing (or grounding) of the screening electrode 6 is not ideal, because total enforcement of zero or ground potential at the detector electrode 6 is impossible in practice.

Since the open-loop voltage gain $V_0$ in real amplifier circuits cannot be infinitely large, the input voltage $U_1$ of the current-tovoltage converter 10 is not absolutely maintained at zero either. For this reason, a small residual voltage occurs at the detector electrode 3. To ensure that the capacitance between the electrodes 3 and 6 has no effect on the signal evaluation, no current must flow across this capacitance. This is achieved in the known way by ensuring that the screening electrode 6 always receives exactly the same A.C. voltage as the detector electrode. This is achieved by the isolation amplifier 11, whose operational amplifier always has a gain of precisely 1 (unity gain), and which ensures that the potential of the screening electrode 6 matches the potential of the detector electrode 3.

The operational amplifier 101 is typically a TL 084 ACD sold by Texas Instruments. The impedance Z1 is typically a 3 Mega-Ohm resistor connected in parallel with a 100 pF capacitor.

Figure 2:
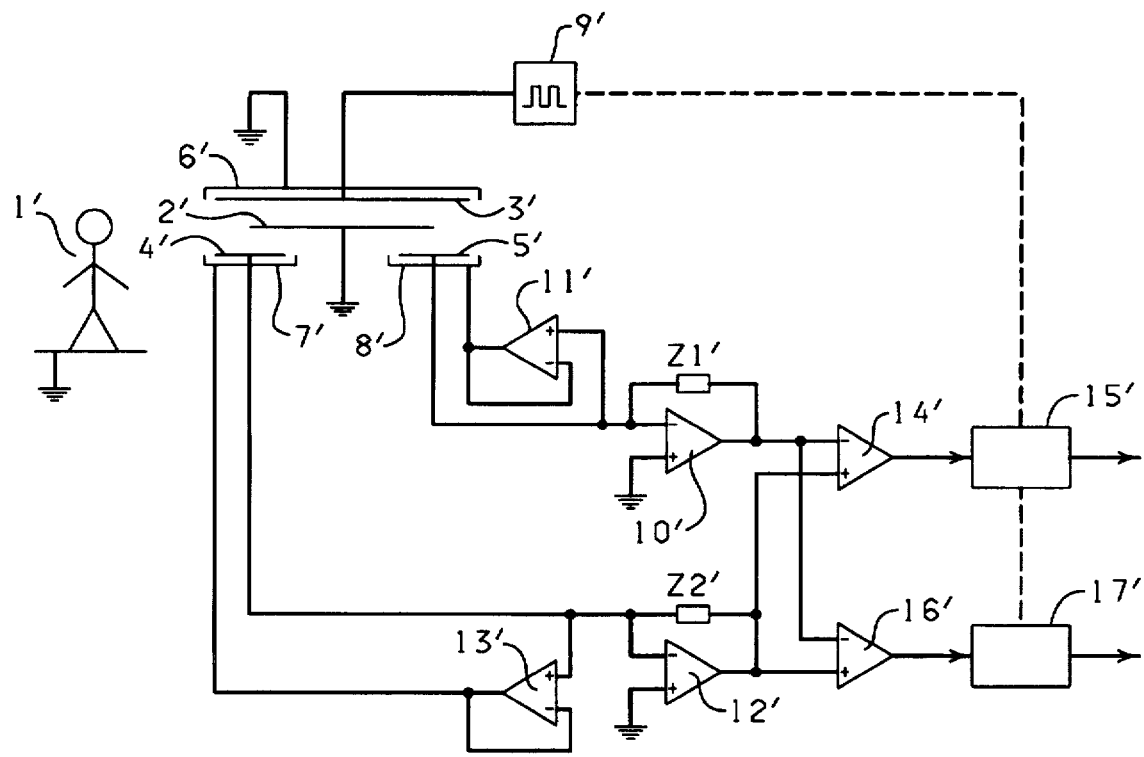
FIG. 2 is a diagrammatic, partial cross-sectional, schematic view of another sensor device constructed in accordance with the present invention.

In the second design shown in FIG. 2, the width detector electrode is the transmission electrode 3', which is fed by the oscillator 9' and from which the capacitive displacement currents flow to the two detector electrodes 4', 5', which here constitute the edge electrodes. These two displacement currents are now —individually —led to an evaluation circuit with a current-to-voltage converter comprising a first operational amplifier 10'and a second operational amplifier 12', as described for the first design. Here, too, the A.C. voltages at the detector electrodes are kept very small, so that the interference capacitance between the web 2 and the detector electrodes 4', 5'has no effect. A third operational amplifier or difference amplifier 14'forms the difference between the output signals of the current-to-voltage converters 10', 12', and the signal obtained in this way is again led to the demodulator 15'. The difference amplifier 14'is typically an operational amplifier.

With this circuit variant it is possible to form not only the differential signal of the receiving electrodes but also the summation signal (amplifier 16', demodulator 17'), to obtain information about the web width, as is often required.

Figure 3:
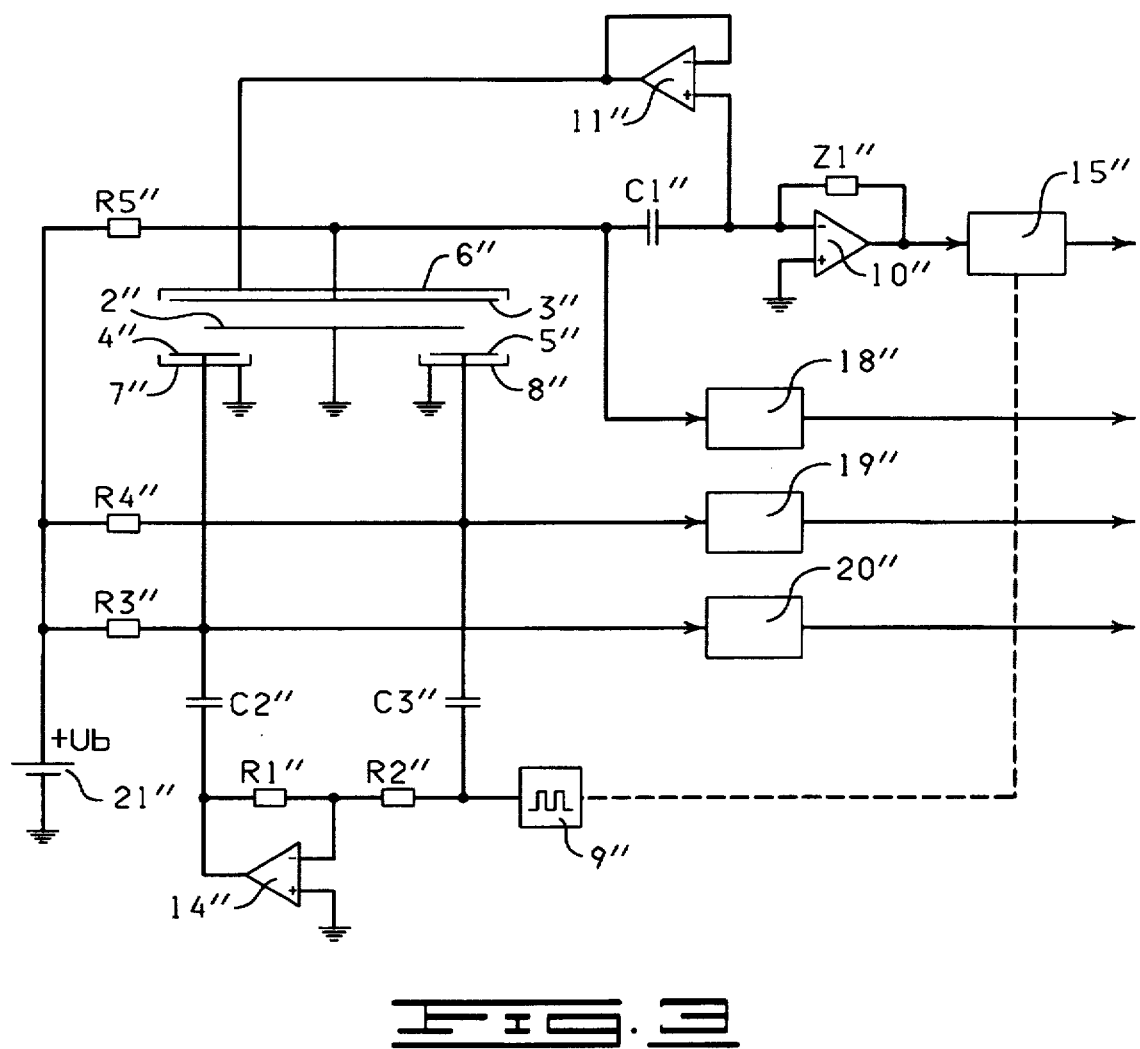

FIG. 3 shows a further design of the first variant in which the insulation of the active electrodes of the device is monitored. Since the individual electrodes have to be fastened to the frame of the device via insulators, conductive impurities on the surface of these insulators can impair the functioning of the device. Particularly where such devices are installed in drying or heating furnaces, such insulation monitoring is particularly advantageous, since it is often very difficult and laborious for maintenance personnel to gain access, and soiling of the insulators may well occur, depending on the furnace atmosphere.

As shown in FIG. 3, the three electrodes 4" and 5" are connected to a D.C. voltage source 21" via resistors R3', R4" and R5". The D.C. voltage at the electrodes can be monitored by the comparators 18", 19" and 20". With correct choice of response thresholds of the comparators and of the resistors R3", R4" and R5", an alarm signal is obtained at the outputs of the comparators 18", 19" and 20" before the soiling of the insulators impairs the functioning of the device. The capacitors C1", C2" and C3" decouple the position signal evaluation from the insulation monitoring.

Changes may be made in the embodiments of the invention described herein, or in the parts or the elements of the embodiments described herein, or in the steps or sequence of steps of the methods described herein, without departing from the spirit and/or the scope of the invention as defined in the following claims.

What is claimed is:

1. A sensor device, comprising:

a grounded strip of conductive material, the strip of conductive material having opposite sides and opposite edges;

a transmission electrode disposed adjacent one side of the strip of conductive material, the transmission electrode having portions extending beyond the respective opposite edges of the strip of conductive material;

two detector electrodes disposed on the side of the strip of conductive material opposing the transmission electrode, the detector electrodes being capacitively coupled to the transmission electrode and being capacitively coupled to the strip of conductive material;

oscillator means electrically connected to the transmission electrode for transmitting a signal to the transmission electrode; and evaluation circuit means connected to each of the detector electrodes for outputting a signal indicating the position of the strip of conductive material relative to the position of the detector electrodes and the transmitting electrode and for maintaining the detector electrodes at substantially the same voltage potential as the strip of conductive material such that the voltage potential on each detector electrode follows the voltage potential on the strip of conductive material whereby the interference capacitance between the strip of conductive material and the detector electrodes is substantially eliminated.

2. The sensor device of claim 1 wherein the sensor device further comprises:

two screening electrodes, each screening electrode being associated with one of the detector electrodes; and amplifier means having a unity gain factor connected to the screening electrodes for maintaining each screening electrode at substantially the same voltage potential as each respective detector electrode.

3. The sensor device of claim 1 wherein the evaluation circuit means is a current to voltage converter.

4. The sensor device of claim 3 wherein the current to voltage converter further comprises:

a first operational amplifier having an inverting input, a non-inverting input, and an output, the inverting input of the first operational amplifier being connected to one of the detector electrodes, the non-inverting input being connected to ground potential, and the output of the first operational amplifier being connected to the inverting input of the first operational amplifier via a feedback impedance;

a second operational amplifier having an inverting input, a non-inverting input, and an output, the inverting input of the second operational amplifier being connected to the other detector electrode, the non-inverting input of the second operational amplifier being connected to zero potential, and the output of second operational amplifier being connected to the inverting input of the second operational amplifier via a feedback impedance; and a third operational amplifier having an inverting input, and a non-inverting input, the inverting input of the third operational amplifier being connected to the output of the first operational amplifier and the non-inverting input of the third operational amplifier being connected to the output of the second operational amplifier.

5. The sensor device of claim 4 further comprising:

a summing amplifier means connected to the output of the first operational amplifier and the output of the second operational amplifier for outputting a signal providing information about the width of the strip of conductive material.

6. The sensor device of claim 1 further comprising: a D.C. voltage source connected to the transmission electrode and connected to each of the two detector electrodes; and three comparators, each of the comparators being connected to one of the transmitter and detector electrodes such that each of the transmitter and detector electrodes is connected to one of the comparators, the voltage potential of each of the transmitter and detector electrodes being monitored by the comparators in order to verify the insulation effect of their mountings.

7. The sensor device of claim 1 further comprising:

a screening electrode associated with the transmission electrode, the screening electrode being connected to ground.

8. A sensor device comprising:

a grounded strip of conductive material, the strip of conductive material having opposing sides and opposing edges;

a detector electrode disposed adjacent one side of the strip of conductive material, the detector electrode having portions extending beyond the respective opposing edges of the strip of conductive material, the detector electrode being capacitively coupled to the strip of conductive material;

two transmission electrodes disposed adjacent the side of the strip of conductive material opposing the detector electrode, the detector electrode being capacitively coupled to the transmission electrodes;

oscillator means electrically connected to the transmission electrodes for transmitting a signal to the transmission electrodes; and evaluation circuit means connected to the detector electrode for outputting a signal indicating the position of the strip of conductive material relative to the position of the detector electrode and the transmission electrodes and for maintaining the detector electrode at substantially the same voltage potential as the strip of conductive material such that the voltage potential on the detector electrode follows the voltage potential on the strip of conductive material whereby the interference capacitance between the strip of conductive material and the detector electrode is substantially eliminated.

9. The sensor device of claim 8 wherein the signal received by one of the transmission electrodes is 180 degrees out of phase with the signal received by the other transmission electrode.

10. The sensor device of claim 8 wherein the evaluation circuit is a current to voltage convertor.

11. The sensor device of claim 8 wherein the evaluation circuit further comprises:
an operational amplifier having an inverting input, a non-inverting input and an output, the inverting input being connected to the detector electrode, the non-inverting input being connected to ground potential, and the output of the operational amplifier being connected to the inverting input of the operational amplifier via a feedback impedance.

12. The sensor device of claim 8 further comprising:
a screening electrode associated with the detector electrode;
amplifier means having a unity gain factor connected to the screening electrode for maintaining the screening electrode at substantially the same voltage potential as the detector electrode.

13. The sensor device of claim 8 further comprising:
two screening electrodes associated with the transmission electrodes, the screening electrodes being connected to ground.

14. A sensor device as defined in claim 8, wherein one of the transmission electrodes has a portion extending beyond one of the opposing edges of the grounded strip of conductive material and the other one of the transmission electrodes has a portion extending beyond the other one of the opposing edges of the grounded strip of conductive material.

15. A sensor device as defined in claim 8, wherein the grounded strip of conductive material is spaced a distance from the detector electrode and each of the transmission electrodes.

16. A sensor device as defined in claim 8, wherein the strip of conductive material is a moving web.

17. A sensor device as defined in claim 8, wherein the evaluation circuit means includes means for determining the lateral movement of the grounded strip of conductive material.

18. A sensor device as defined in claim 8, wherein the oscillator means includes means for transmitting a signal from the transmission electrode to the detector electrode.

19. A sensor device, comprising:
a grounded strip of conductive material, the strip of conductive material having opposite sides and opposite edges;
a first electrode array disposed adjacent one side of the strip of conductive material, the first electrode array having portions extending beyond the respective opposite edges of the strip of conductive material and the first electrode array being formed by an electrode;
a second electrode array disposed on the side of the strip of conductive material opposing the first electrode array, the second electrode array being formed by two electrodes which are each capacitively coupled to the first electrode array and capacitively coupled to the strip of conductive material;
oscillator means electrically connected to one of the first and second electrode arrays for forming a transmission array and for transmitting a signal to the transmission array; and
evaluation circuit means connected to the other one of the first and second electrode arrays for forming a detector array and for outputting a signal indicating the position of the strip of conductive material relative to the position of the detector array and the transmission array and for maintaining the detector array at substantially the same voltage potential as the strip of conductive material such that the voltage potential on each detector array follows the voltage potential on the strip of conductive material whereby the interference capacitance between the strip of conductive material and the detector array is substantially eliminated.

20. A sensor device, comprising:
a grounded strip of conductive material, the strip of conductive material having opposite sides and opposite edges;
a transmission electrode disposed adjacent one side of the strip of conductive material, the transmission electrode having portions extending beyond the respective opposite edges of the strip of conductive material;
a first screening shield electrode associated with the transmission electrode, the first screening electrode being connected to ground potential;
two detector electrodes disposed on the side of the strip of conductive material opposing the transmission electrode, the detector electrodes being capacitively coupled to the transmission electrode and being capacitively coupled to the strip of conductive material;
two second screening electrodes, each second screening electrode being associated with one of the detector electrodes;
amplifier means having a unity gain factor connected to each of the second screening electrodes for maintaining the screening electrodes at the same voltage potential as the detector electrodes associated therewith;
oscillator means electrically connected to the transmission electrode for transmitting a signal to the transmission electrode; and
evaluation circuit means connected to each of the detector electrodes for outputting a signal indicating the position of the strip of conductive material relative to the position of the detector electrodes and the transmitting electrode and for maintaining the detector electrodes at substantially the same voltage potential as the strip of conductive material such that the voltage potential on each detector electrode follows the voltage potential on the strip of conductive material whereby the interference capacitance between the strip of conductive material and the detector electrodes is substantially eliminated.

21. The sensor device of claim 20 wherein the evaluation circuit means further comprises:
a first operational amplifier having an inverting input, a non-inverting input, and an output, the inverting input of the first operational amplifier being connected to one of the detector electrodes, the non-inverting input being connected to ground potential, and the output of the first operational amplifier being connected to the inverting input of the first operational amplifier via a feedback impedance;

a second operational amplifier having an inverting input, a non-inverting input, and an output, the inverting input of the second operational amplifier being connected to the other detector electrode, the non-inverting input of the second operational amplifier being connected to zero potential, and the output of second operational amplifier being connected to the inverting input of the second operational amplifier via a feedback impedance; and a third operational amplifier having an inverting input, and a non-inverting input, the inverting input of the third operational amplifier being connected to the output of the first operational amplifier and the non-inverting input of the third operational amplifier being connected to the output of the second operational amplifier.

22. The sensor device of claim 20 further comprising:

a summing amplifier connected to the output of the first operational amplifier and the output of the second operational amplifier so as to obtain a signal providing information about the width of the strip of conductive material.

23. A sensor device comprising:

a grounded strip of conductive material, the strip of conductive material having opposing sides and opposing edges;

a detector electrode disposed adjacent one side of the strip of conductive material, the detector electrode having portions extending beyond the respective opposing edges of the strip of conductive material, the detector electrode being capacitively coupled to the strip of conductive material;

a first screening electrode associated with the detector electrode;

amplifier means having a unity gain factor connected to the first screening electrode for maintaining the first screening electrode at the same voltage potential as the detector electrode;

two transmission electrodes disposed adjacent the side of the strip of conductive material opposing the detector electrode, the detector electrode being capacitively coupled to the transmission electrodes;

two second screening electrodes associated with the transmission electrodes, the screening electrodes associated with the transmission electrodes being connected to ground;

oscillator means electrically connected to the transmission electrodes for transmitting signals to the transmission electrodes, the signal received by one of the transmission electrodes being 180 degrees out of phase with the signal received by the other transmission electrode; and evaluation circuit means connected to the detector electrode for outputting a signal indicating the position of the strip of conductive material relative to the position of the detector electrode and the transmission electrodes and for maintaining the detector electrode at substantially the same voltage potential as the strip of conductive material such that the voltage potential on the detector electrode follows the voltage potential on the strip of conductive material whereby the interference capacitance between the strip of conductive material and the detector electrode is substantially eliminated.

24. The sensor device of claim 23 wherein the evaluation circuit further comprises:

an operational amplifier having an inverting input, a non-inverting input and an output, the inverting input being connected to the detector electrode, the non-inverting input being connected to ground potential, and the output of the operational amplifier being connected to the inverting input of the operational amplifier via a feedback impedance.

25. A sensor device for the contactless detection of a moving web fabricated of a conductive material, the moving web having opposing sides and opposing edges, comprising:

a first electrode array disposed adjacent one side of the moving web and spaced a distance therefrom, the first electrode array having portions extending beyond the respective opposing edges of the moving web, the first electrode array being capacitively coupled to the moving web and formed by an electrode;

a second electrode array disposed adjacent the side of the moving web opposing the first electrode array and spaced a distance therefrom, the first electrode array being capacitively coupled to the second electrode array, the second electrode array being formed by two electrodes wherein one of the electrodes of the second electrode array has a portion extending beyond one of the opposing edges of the moving web and the other one of the electrodes of the second electrode array has a portion extending beyond the other one of the opposing edges of the moving web;

oscillator means electrically connected to one of the first and second electrode arrays for forming a transmission array and for transmitting a signal to the transmission array; and evaluation circuit means connected to the other one of the first and second electrode arrays for forming a detector array and for outputting a signal indicating the position of the moving web relative to the position of the detector array and the transmission array and for maintaining the detector array at substantially the same voltage potential as the moving web such that the voltage potential on the detector array follows the voltage potential on the moving web whereby the interference capacitance between the moving web and the detector array is substantially eliminated.

26. A sensor device, comprising:

a strip of conductive material, the strip of conductive material having opposite sides and opposite edges;

a first electrode array disposed adjacent one side of the strip of conductive material, the first electrode array having portions extending beyond the respective opposite edges of the strip of conductive material and the first electrode array being formed by an electrode;

a second electrode array disposed on the side of the strip of conductive material opposing the first electrode array, the second electrode array being formed by two electrodes which are each capacitively coupled to the first electrode array and capacitively coupled to the strip of conductive material;

oscillator means electrically connected to one of the first and second electrode arrays for forming a transmission array and for transmitting a signal to the transmission array; and evaluation circuit means connected to the other one of the first and second electrode arrays for forming a detector array and for outputting a signal indicating the position of the strip of conductive material relative to the position of the detector array and the transmission array and for maintaining the detector array at substantially the same voltage potential as the strip of conductive material such that the voltage potential on each detector array follows the voltage potential on the strip of conductive material whereby the interference capacitance between the strip of conductive material and the detector array is substantially eliminated.

* * * * *

UNITED STATES PATENT AND TRADEMARK OFFICE
CERTIFICATE OF CORRECTION

PATENT NO. : 5,767,686

DATED : June 16, 1998

INVENTOR(S) : Peter Kespohl

It is certified that error appears in the above-identified patent and that said Letters Patent is hereby corrected as shown below:

Column 3, line 27, please delete "10" and substitute therefore --101--.

Column 3, line 28, please delete "current-tovoltage" and substitute therefor --current-to-voltage--.

Column 3, lines 60 and 62, please delete "." and substitute therefore --,--.

Column 4, line 3, please delete "U = - U./V/" and substitute therefore --$U_i = -U_o/V_o$--.

Column 4, lines 5, 6, 8, and 18 please delete "." and substitute therefore --,--.

UNITED STATES PATENT AND TRADEMARK OFFICE
CERTIFICATE OF CORRECTION

PATENT NO. : 5,767,686

DATED : June 16, 1998

INVENTOR(S) : Peter Kespohl

It is certified that error appears in the above-identified patent and that said Letters Patent is hereby corrected as shown below:

Column 4, line 18, please delete "currentto-voltage" and substitute therefor --current-to-voltage--.

Column 4, line 35, please delete "∘" and substitute therefor --.--.

Column 4, line 37, please delete "current-tovoltage" and substitute therefor --current-to-voltage--.

Signed and Sealed this

Seventeenth Day of November, 1998

BRUCE LEHMAN

Attest:

Attesting Officer

Commissioner of Patents and Trademarks